(12) United States Patent
Hair, III et al.

(10) Patent No.: US 7,644,533 B2
(45) Date of Patent: Jan. 12, 2010

(54) FISH-LURING APPARATUS

(75) Inventors: James M. Hair, III, Cheyenne, WY (US); Daniel L. Greene, Cheyenne, WY (US)

(73) Assignee: Cagi Outdoor Products, Cheyenne, WY (US)

( * ) Notice: Subject to any disclaimer, the term of this patent is extended or adjusted under 35 U.S.C. 154(b) by 238 days.

(21) Appl. No.: 11/479,688

(22) Filed: Jun. 30, 2006

(65) Prior Publication Data

US 2008/0000141 A1 Jan. 3, 2008

(51) Int. Cl.
*A01K 85/01* (2006.01)
*A01K 85/12* (2006.01)

(52) U.S. Cl. .................... 43/42.31; 43/42.14; 43/42.19; 43/42.2

(58) Field of Classification Search ............... 43/42.11, 43/42.12, 42.13, 42.14, 42.15, 42.16, 42.17, 43/42.18, 42.19, 42.2, 42.21, 42.31
See application file for complete search history.

(56) References Cited

U.S. PATENT DOCUMENTS

| | | | | |
|---|---|---|---|---|
| 315,967 A | * | 4/1885 | Spencer | 43/42.2 |
| 323,111 A | * | 7/1885 | Chapman | 43/42.12 |
| 667,257 A | * | 2/1901 | Shakespeare et al. | 43/42.14 |
| 747,976 A | * | 12/1903 | Junod | 43/42.2 |
| 839,917 A | * | 1/1907 | Chapman | 43/42.12 |
| 1,620,972 A | * | 3/1927 | Hobbs | 43/42.2 |
| 1,797,234 A | * | 3/1931 | Jordan | 43/42.2 |
| 1,897,529 A | * | 2/1933 | Palmer et al. | 43/42.2 |
| 2,244,378 A | * | 6/1941 | Turner | 43/42.14 |
| 2,266,234 A | * | 12/1941 | Mitchell | 43/42.13 |
| 2,306,640 A | * | 12/1942 | Nelson | 43/42.14 |
| 2,472,639 A | * | 6/1949 | Wickens | 43/42.14 |
| 2,507,098 A | * | 5/1950 | Fischler | 43/42.16 |
| 2,569,057 A | * | 9/1951 | Hinerman | 43/42.14 |
| 2,585,494 A | * | 2/1952 | Pelto | 43/42.14 |
| 2,610,429 A | * | 9/1952 | Thomas | 43/42.17 |
| 2,653,408 A | * | 9/1953 | Bradley | 43/42.12 |
| 2,708,805 A | * | 5/1955 | Garvie | 43/42.15 |
| 2,722,079 A | * | 11/1955 | Johnson | 43/42.14 |
| 2,764,835 A | * | 10/1956 | Schaller | 43/42.2 |
| 2,804,713 A | * | 9/1957 | Johnson | 43/42.2 |

(Continued)

FOREIGN PATENT DOCUMENTS

FR 2650479 A1 * 2/1991

(Continued)

*Primary Examiner*—Darren W Ark
(74) *Attorney, Agent, or Firm*—Staas & Halsey LLP

(57) ABSTRACT

An apparatus for fish-luring use with a separate fishing line includes a fishing-line-attachable shaft (e.g., a straight length of rigid wire) on which are mounted first and second rotator members. At least the first rotator is mounted rotatably and slideably for rotation and axially movement relative to the second rotator in response to water pressure when the shaft is moved forwardly in a body of water. The interaction of an irregular non-planar rearwardly facing end on the first rotator with an irregular non-planar forwardly facing end on the second rotator produces fish-luring vibrations. In one embodiment, the second rotator is also mounted rotatably and slideably, with the first rotator rotating clockwise, the second rotator rotating counterclockwise, and circumferentially spaced apart protrusions on the rearwardly facing end of the first rotator interacting with circumferentially spaced apart indentations on the forwardly facing end of the second rotator to produce the fish-luring vibrations.

8 Claims, 3 Drawing Sheets

U.S. PATENT DOCUMENTS

| | | | | |
|---|---|---|---|---|
| 2,886,913 A * | 5/1959 | Stanley | | 43/42.19 |
| 2,895,253 A * | 7/1959 | Hess | | 43/42.15 |
| 2,977,705 A * | 4/1961 | Busnel | | 43/17.1 |
| 3,000,130 A * | 9/1961 | Pankuch | | 43/42.17 |
| 3,035,367 A * | 5/1962 | Troyer | | 43/42.16 |
| 3,078,611 A * | 2/1963 | Nishioka | | 43/42.16 |
| 3,112,576 A * | 12/1963 | Tay | | 43/42.14 |
| 3,165,854 A * | 1/1965 | Teetor | | 43/42.12 |
| 3,296,733 A * | 1/1967 | McLean | | 43/42.16 |
| 3,340,643 A * | 9/1967 | Weimer | | 43/42.12 |
| 3,397,478 A * | 8/1968 | Lowes, Jr. | | 43/42.14 |
| 3,439,443 A * | 4/1969 | Weimer | | 43/42.12 |
| 3,494,063 A * | 2/1970 | Treaster | | 43/42.14 |
| D217,603 S * | 5/1970 | Self | | 43/42.14 |
| 3,530,612 A * | 9/1970 | Garrison | | 43/42.16 |
| 3,533,183 A * | 10/1970 | Treaster | | 43/42.21 |
| 3,766,682 A * | 10/1973 | Majdak | | 43/42.14 |
| 4,035,945 A * | 7/1977 | Newman | | 43/42.15 |
| 4,135,323 A * | 1/1979 | Esten | | 43/42.16 |
| 4,139,964 A * | 2/1979 | Pelletier | | 43/42.14 |
| 4,163,338 A * | 8/1979 | Lucarini | | 43/42.17 |
| 4,257,183 A * | 3/1981 | Arms | | 43/42.19 |
| 4,447,980 A * | 5/1984 | Bassett | | 43/42.14 |
| 4,616,440 A * | 10/1986 | Millroy | | 43/42.12 |
| 4,637,158 A * | 1/1987 | Reid | | 43/42.19 |
| 4,730,410 A * | 3/1988 | Sobieniak | | 43/42.19 |
| 4,794,721 A * | 1/1989 | Rowe et al. | | 43/42.14 |
| 5,201,859 A * | 4/1993 | Rosek | | 43/42.19 |
| 5,321,905 A * | 6/1994 | Higgins | | 43/42.14 |
| 5,497,581 A * | 3/1996 | Williams | | 43/42.31 |
| 5,564,218 A * | 10/1996 | Kato | | 43/42.13 |
| 5,566,497 A * | 10/1996 | Oesterreich | | 43/42.16 |
| 5,628,139 A * | 5/1997 | Rhoten | | 43/42.15 |
| 6,176,035 B1 * | 1/2001 | Somogyi | | 43/42.14 |
| 6,427,375 B1 * | 8/2002 | Hair et al. | | 43/42.12 |
| 6,508,029 B2 * | 1/2003 | Grindley | | 43/42.12 |
| 6,523,297 B1 * | 2/2003 | Hair et al. | | 43/42.2 |
| 7,360,335 B2 * | 4/2008 | Edwards | | 43/42.14 |
| 7,493,724 B1 * | 2/2009 | Peterson | | 43/42.17 |
| 2004/0025405 A1 * | 2/2004 | Rivera Gomez | | 43/42.12 |
| 2006/0086034 A1 * | 4/2006 | Ukita | | 43/42.19 |
| 2008/0066368 A1 * | 3/2008 | Ciotlos | | 43/42.19 |
| 2008/0092429 A1 * | 4/2008 | Turner | | 43/42.2 |

FOREIGN PATENT DOCUMENTS

| | | | |
|---|---|---|---|
| FR | 2766056 A3 * | 1/1999 | |
| FR | 2796246 A1 * | 1/2001 | |
| FR | 2806875 A1 * | 10/2001 | |
| GB | 2268672 A * | 1/1994 | |
| JP | 08140531 A * | 6/1996 | |
| JP | 09266737 A * | 10/1997 | |
| JP | 11098936 A * | 4/1999 | |
| WO | WO 03059056 A1 * | 7/2003 | |

* cited by examiner

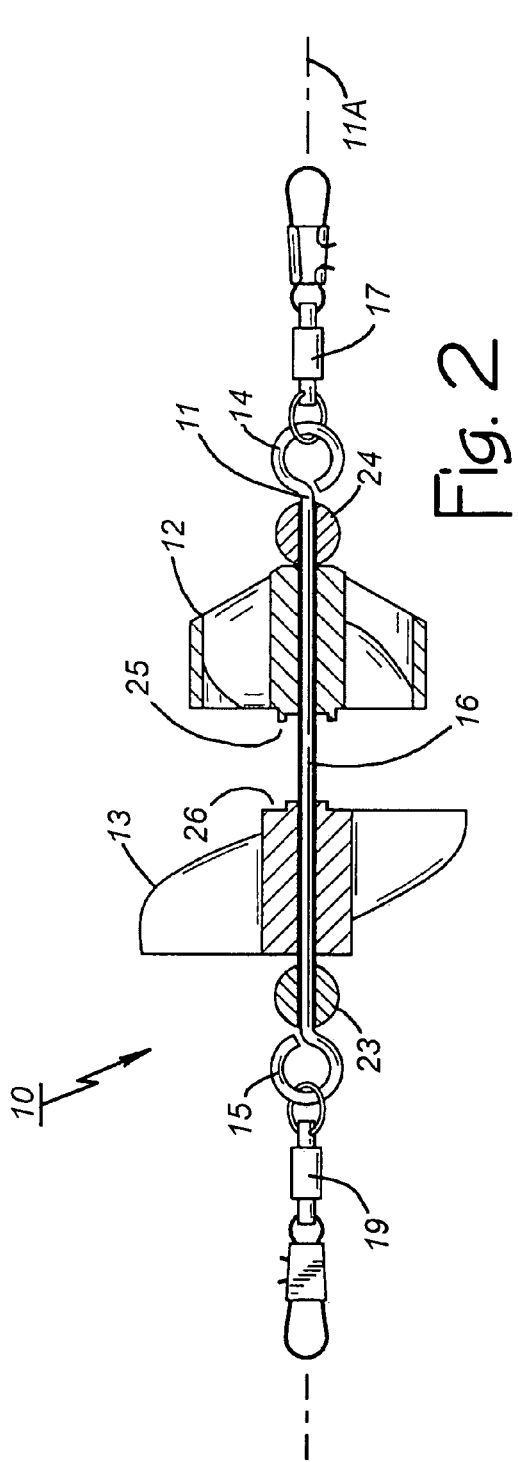
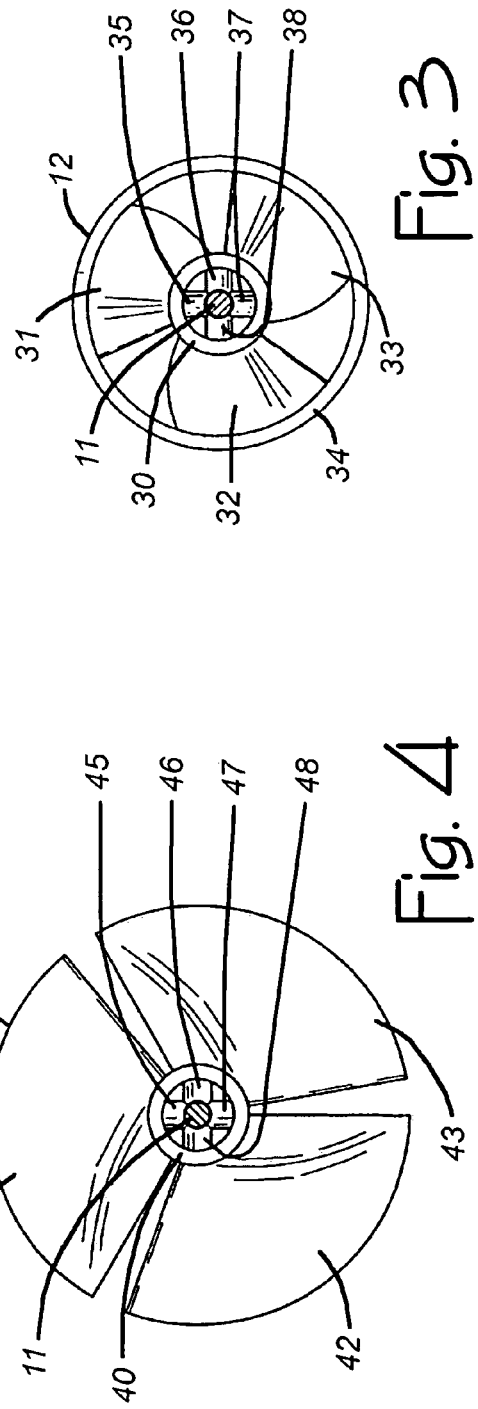

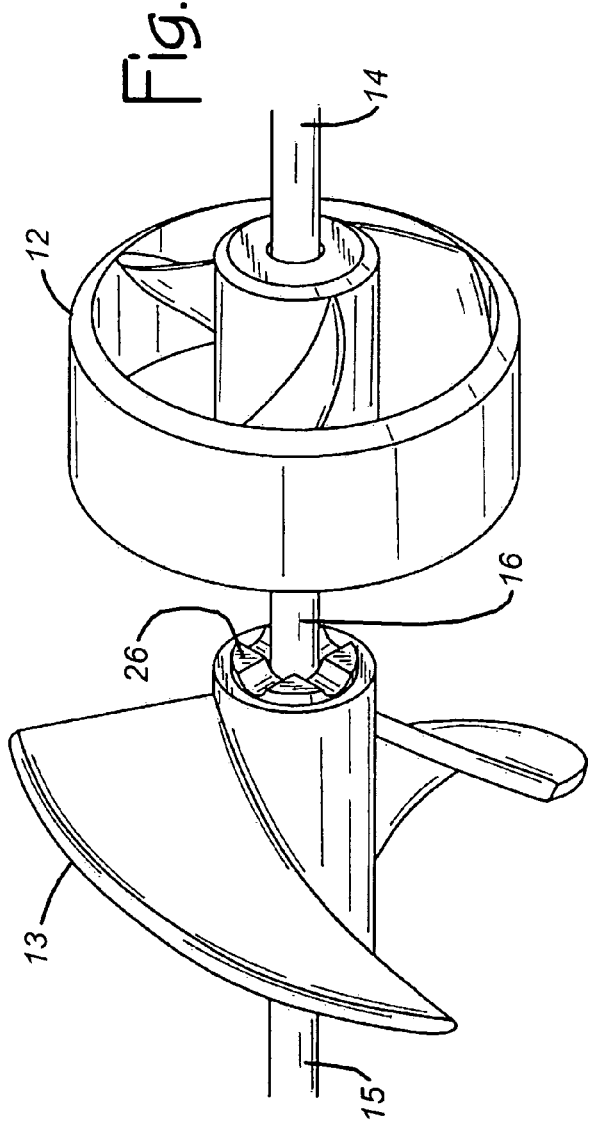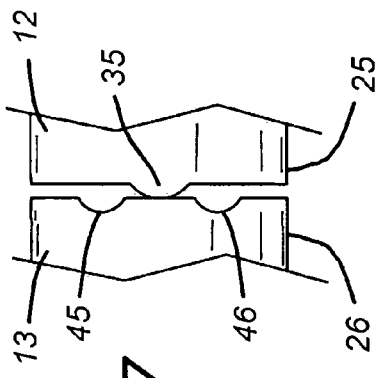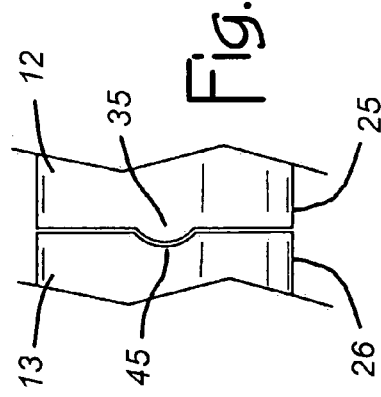

FISH-LURING APPARATUS

BACKGROUND OF THE INVENTION

1. Technical Field

This invention relates generally to fishing tackle, and more particularly to a sound-emitting, fish-luring apparatus.

2. Description of Related Art

Predatory fish do not just locate prey optically. Their sight is limited. Even in reasonably clear water, the design of the average game fish's eyes does not let it see anything more than 20-30 feet away with any degree of clarity. For the majority of warm water lakes or silty rivers, the distance light travels may fall to near zero. This is, perhaps, the reason that the many spinning and crank baits try to utilize a "flash" of light to attract the attention of game fish in the belief that a flashing light carries farther and demands more attention than a stationary reflection surface.

Sound, however, propagates very well in water. Some predatory fish can detect low frequency vibrations produced by other fish at distances varying from immediate striking range to several hundred feet or more. But, existing sound-emitting fishing lures have very limited success at effectively producing fish-attracting low frequency vibrations (e.g., 100 to 500 Hertz) within a small (e.g., less than six inches long) resonating chamber or generator. One, for example, uses a small bell mounted in-line upon the lure for resonance and it fails to produce a suitable frequency. Another uses complicated microelectronics fitted on the lure that are far too expensive.

U.S. Pat. No. 6,427,375 B1 and U.S. Pat. No. 6,523,297 B1 describe sound-emitting fishing lures that use the water itself to produce low frequency vibrations within the most effective hearing range of most game fish. The fishing lures include outer and inner bodies mounted on a shaft. The outer body channels water through its hollow interior as it is retrieved, while the inner body rotates as a gating component that interrupts the flow intermittently and/or vibrates ball bearings in order to produce low frequency vibrations. The fishing lures are small (less than six inches long) sound generators that result in low frequency vibrations in the 100 to 500 Hertz range at realistic retrieval rates in the one foot-per-second to five feet-per-second range. Nevertheless, there are some size, complexity, and expense factors of the structure employed that remain of concern and so improvements are still needed.

SUMMARY OF THE INVENTION

This invention addresses the need outlined above by providing an apparatus for fish-luring use with a separate fishing line. The apparatus includes a fishing-line-attachable shaft (e.g., a straight length of rigid wire) on which are mounted first and second rotator members. At least the first rotator is mounted rotatably and slideably for rotational and axially movement relative to the second rotator in response to water pressure when the shaft is moved forwardly in a body of water. The interaction of an irregular non-planar rearwardly facing end on the first rotator with an irregular non-planar forwardly facing end on the second rotator produces low frequency vibrations (e.g., 100 to 500 Hertz) within the most effective hearing range of most game fish that are referred to herein as fish-luring vibrations.

Thus, a smaller, light weight, less complicated, less expensive, more conveniently fabricated fish-luring apparatus is achieved. In one embodiment, the second rotator is also mounted rotatably and slideably, with the first rotator rotating counterclockwise, the second rotator rotating clockwise, and a plurality of circumferentially spaced apart protrusions on the rearwardly facing end of the first rotator interacting with circumferentially spaced apart indentations on the forwardly facing end of the second rotator to produce the desired fish-luring vibrations.

To paraphrase some of the more precise language appearing in the claims and further introduce the nomenclature used, an apparatus for luring fish includes a shaft and two rotator members on the shaft. The shaft extends axially along a rotational axis; it has a forward end portion for connection to a separate fishing line, a rearward end portion opposite the forward end, and a mid-section extending between the forward and rearward end portions.

The first rotator member has a non-planar rearwardly facing end while the second rotator member has a non-planar forwardly facing end. At least the first rotator member is mounted on the shaft rotatably, for rotation about the rotational axis relative to the second rotator member in response to water pressure when the shaft is moved forwardly in a body of water. At least the first rotator member is mounted on the shaft slideably too, for movement axially along the shaft toward and away from the second rotator member as the non-planar rearwardly facing end of the first rotator member bears against and rotates relative to the non-planar forwardly facing end of the second rotator member. That interaction produces the desired fish-luring vibrations.

In one preferred embodiment, the second rotator member is also mounted rotatably and slideably. The first rotator member includes first means for causing the first rotator member to rotate in a first direction on the shaft in response to water pressure when the apparatus is moved forwardly in the body of water, said first means including a first plurality of impeller blades on the first rotator member. Similarly, the second rotator member is mounted on the shaft rotatably for rotation about the rotational axis relative to the first rotator member in response to said water pressure; the second rotator member includes means for causing the second rotator member to rotate on the shaft in an opposite direction in response, said second means including a second plurality of impeller blades on the second rotator member. Thus, the apparatus includes a second rotator member that counter balances the first rotator member.

In addition, the rearwardly facing end of the first rotator member defines a plurality of rearwardly facing and circumferentially spaced apart protrusions. Similarly, the forwardly facing end of the second rotator member defines a plurality of forwardly extending and circumferentially spaced apart indentations. The protrusions and the indentations interact when the rearwardly facing end of the first rotator member bears against and rotates relative to the forwardly facing end of the second rotator member to thereby produce the fish-luring vibrations.

Thus, the invention provides an apparatus for fish-luring use with a separate fishing line that includes a fishing-line-attachable shaft on which are mounted interacting first and second rotator members. The interaction of an irregular non-planar rearwardly facing end on the first rotator with an irregular non-planar forwardly facing end on the second rotator produces fish-luring vibrations with a smaller, lighter, less complicated, less expensive, more conveniently fabricated apparatus. The following illustrative drawings and detailed description make the foregoing and other objects, features, and advantages of the invention more apparent.

BRIEF DESCRIPTION OF THE DRAWINGS

FIG. 2 of the drawings is a side elevation view with portions in cross section as viewed in a bisecting plane containing a central rotational axis of the fish-luring apparatus;

FIG. 3 is a transverse cross-sectional view of the fish-luring apparatus as viewed in a transverse plane perpendicular to the rotational axis that contains a line 3-3 in FIG. 1;

FIG. 4 is a transverse cross-sectional view of the fish-luring apparatus as viewed in a transverse plane perpendicular to the rotational axis that contains a line 4-4 in FIG. 1;

FIG. 5 is an enlarged perspective view of the first and second rotators of the fish-luring apparatus;

FIG. 6 is a further enlarged side view of the abutting rearwardly facing end of the first rotator and the forwardly facing end of the second rotator that shows their relative positions in an axially un-spaced configuration wherein protrusions on the rearwardly facing end are aligned with indentations on the forwardly facing end; and FIG. 7 is a view of the rearwardly and forwardly facing ends of the first and second rotators in an axially spaced apart configuration wherein the protrusions and the indentations are not aligned.

DESCRIPTION OF THE PREFERRED EMBODIMENTS

Figure 1:
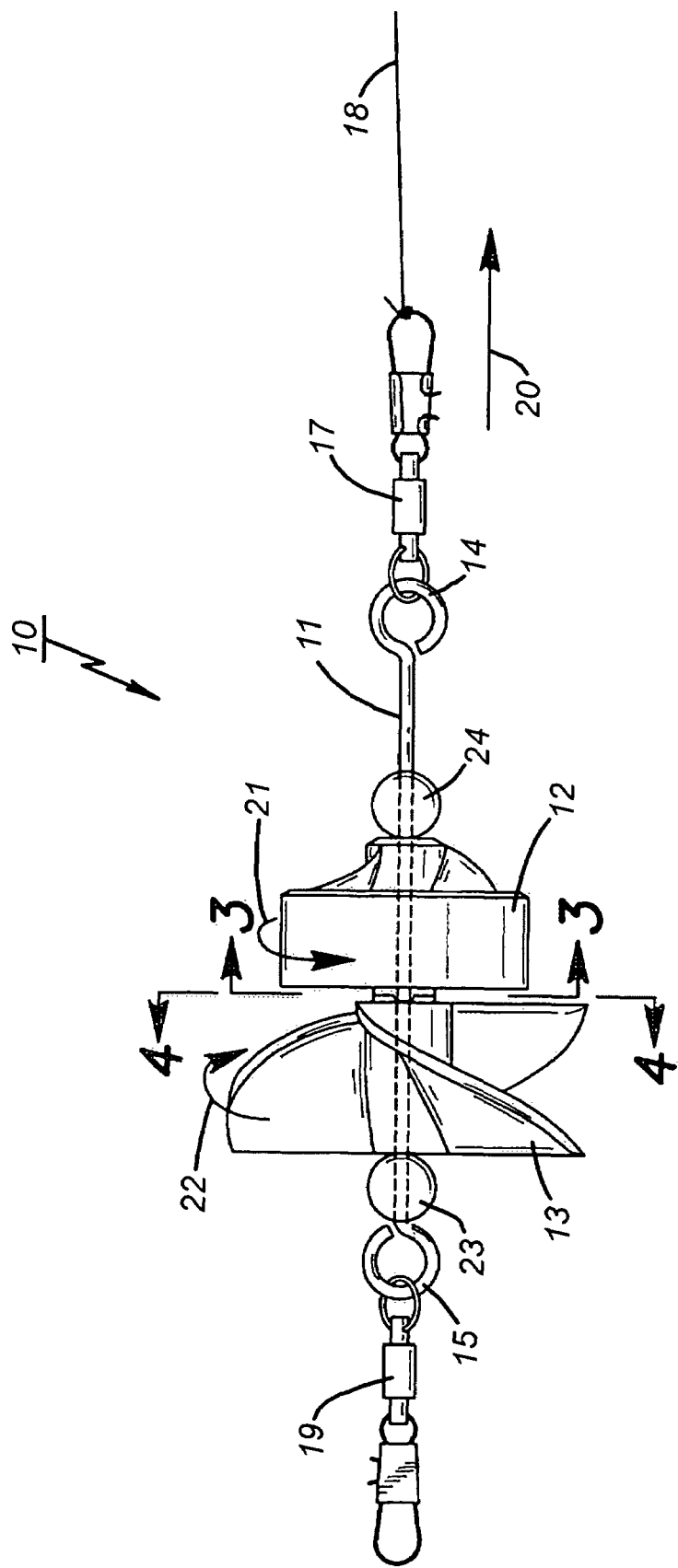
FIG. 1 of the drawings is a side elevation view of a fish-luring apparatus constructed according to the invention.

The drawings show various aspects of a fish-luring apparatus 10 constructed according to the invention. Generally, the apparatus 10 includes a shaft 11, a first rotator 12, and a second rotator 13 (FIG. 1). The shaft 11 has a forwardly disposed first terminal end portion 14 (i.e., a forward end), a rearwardly disposed second terminal end portion 15 (i.e., a rearward end), a mid-section 16 that extends between the first and second terminal end portions 14 and 15, and an overall length that may, for example, measure about 2.25 inches. The shaft 11 may, for example, take the form of a straight length of somewhat stiff wire (e.g., stainless steel wire with an outside diameter in the range of about 0.032 inches to about 0.064 inches) that has swivel-receiving loops formed at both ends. It extends along an axis of elongation that is also the rotational axis 11A (FIG. 2) for the rotators 12 and 13, with a first swivel-and-connector combination 17 connecting the first terminal end portion 14 to a fishing line 18 and a second swivel-and-connector combination 19 connecting the second terminal end portion 15 to another length of fishing line, or to a hook, or some other form of fishing lure (not shown).

In operation, the apparatus 10 is retrieved (i.e., moved forwardly) in a body of water (e.g., a lake being fished) in a forward direction that is depicted in FIG. 1 by an arrow 20. Doing so results in water pressure causing the first rotator 12 to rotate on the shaft 11 about the axis of rotation 11A in a counterclockwise direction as depicted by an arrow 21 in FIG. 1; it is counterclockwise from the viewpoint of a viewer looking from the forward end of the shaft 11 toward the rearward end. The first rotator 12 fits loosely enough on the shaft 11 to enable it to rotate in response to the water pressure. The first rotator 12 also fits loosely enough to enable it to slide axially along the shaft 11 in response to the water pressure. Thus, moving the apparatus 10 forwardly in the body of water results in water pressure causing the first rotator 12 to bear rearwardly against the second rotator 13.

Similarly, moving the apparatus 10 forwardly in the body of water results in water pressure causing the second rotator 13 to rotate on the shaft 11 about the axis of rotation 11A in a clockwise direction as depicted by an arrow 22 in FIG. 1. It also results in water pressure causing the second rotator 13 to bear against an axially slideable separator bead 23 that provides a bearing surface for the second rotator 13 apart from the second terminal end portion 15. At this point notice that a second axially slideable bead 24 (FIG. 1) keeps the first rotator 12 from bumping into the first terminal end portion 14 (and perhaps getting stuck there) when the apparatus 10 is not in use.

With the first rotator 12 bearing against the second rotator 13, and the second rotator 13 bearing against the bead 23 (FIG. 1), the combination of first and second rotators 12 and 13 and the bead 23 slide axially along the shaft 11 until they all come to rest axially, with the bead 23 abutting the second terminal end portion 15. When that combination does come to rest axially, the rotational movement of the first and second rotators 12 and 13 about the rotational axis 11A nevertheless continues, the first rotator 12 rotating counterclockwise (arrow 21) and the second rotator 13 rotating clockwise (arrow 22). As that occurs, a non-planar (i.e., irregular) rearwardly facing end 25 of the first rotator 13 (FIG. 2) and a non-planar forwardly facing end 26 of the second rotator 14 (FIG. 2) interact to produce the desired fish-luring vibrations.

FIG. 2 shows the first and second rotators 12 and 13 and the bead 23 in cross section and separated as they might be when not in use. They are shown way for illustrative reasons, in order to expose the rearwardly facing end 25 and the forwardly facing end 26 so that they can be identified better with numerals and associated lead-lines. FIG. 1, however, shows the combination in operation, bunched up rearwardly and bearing against each other.

FIG. 3 is a transverse cross-sectional view of the apparatus 10 as viewed in a transverse plane perpendicular to the rotational axis that contains a line 3-3 in FIG. 1. With the apparatus 10 viewed that way (i.e., facing forwardly toward the rearwardly facing end of the first rotator 12), the structure of the rearwardly facing end is more clearly visible. The first rotator 12 may take the form of a molded plastic component that includes a hub 30 on the shaft 11, three impeller blades 31, 32, and 33 that extend radially from the hub 30, and a cylindrically shaped shield 34 that is centered on the shaft 11 where it helps deflect weeds and/or other objects from the impeller blades 31-33. The hub 30 defines four axially protruding protrusions 35, 36, 37, and 38 that interact with the second rotator 13 as subsequently described. As a further idea of size, the illustrated first rotator 12 has an outside diameter of about 0.75 inches. Of course, dimensioning may vary significantly without departing from the inventive concepts disclosed.

FIG. 4 is a transverse cross-sectional view of the apparatus 10 as viewed in a transverse plane perpendicular to the rotational axis that contains a line 4-4 in FIG. 1. Facing rearwardly toward the forwardly facing end of the second rotator 13 results in the structure of the forwardly facing end being more clearly visible. The second rotator 13 may also take the form of a molded plastic component. It includes a hub 40 on the shaft 11 and three impeller blades 41, 42, and 43 that extend radially from the hub 40. The hub 30 defines four axially recessed indentations 45, 46, 47, and 48 that interact with the protrusions 35-38 on the first rotator 12 to produce the desired fish-luring vibrations. The illustrated second rotator 13 has an outside diameter of about 1.0 inches, but, of course, dimensioning may vary significantly without departing from the inventive concepts disclosed.

The protrusions 35-38 and the mating indentations 45-48 result in the rearwardly facing end 25 of the first rotator 12 and the forwardly facing end 26 of the second rotator 13 being non-planar (i.e., they are irregular). In operation, with the first and second rotators 12 and 13 rotating in opposite directions, water pressure biases the first rotator 12 toward the second rotator 13 so that the rearwardly facing end 25 slides over the forwardly facing end 26. As the first and second rotators 12 and 13 rotate in opposite directions and the protrusions 35-38 on the rearwardly facing end 25 move into alignment with the indentations 45-48, the first rotator 12 moves axially toward the second rotator 13. As the first and second rotators 12 and 13 continue to rotate in opposite directions and the protrusions 35-38 move out of alignment with the indentations 45-48, the first rotator 12 moves axially away from the second rotator 13 because of the resulting cam action.

The back-and-forth axially movement of the first rotator 12 relative to the second rotator 13 results in the desired fish-luring vibrations. It can be achieved with just the first rotator 12 being rotatable and axially slideable and the second rotator 13 being fixed. In addition, it can be achieved with the rearwardly facing end 25 and the forwardly facing end 26 having other non-planar shapes (i.e., irregular shapes) than the illustrated protrusions 35-38 and indentations 45-48. Based upon the foregoing and subsequent descriptions, and the claims, one of ordinary skill in the art can readily implement a fish-luring apparatus according to the invention with those and other variations, and U.S. Pat. No. 6,427,375 B1 and U.S. Pat. No. 6,523,297 B1 are incorporated herein by reference for all the related information they provide.

Turning now to FIGS. 5, 6, and 7, they further illustrate further aspects of the apparatus 10. FIG. 5 is an enlarged perspective view of a portion of the apparatus 10 that further illustrates the first and second rotators 12 and 13. It also further illustrates the forwardly facing end 26 of the second rotator 13. FIG. 6 is a further enlarged side view of a portion of the rearwardly facing end 25 of the first rotator 12 and a portion of the forwardly facing end 26 of the second rotator 13 that shows their relative positions in an axially un-spaced configuration wherein the protrusions on the rearwardly facing end 25 are aligned with the indentations on the forwardly facing end 26. Just the one protrusion 35 and the one indentation 45 are shown in FIG. 6 for illustrative purposes. FIG. 7 is similar to FIG. 6, but it shows the rearwardly facing end 25 and the forwardly facing end 26 in an axially spaced apart configuration wherein the protrusions and indentations are not aligned. The protrusion 35 is shown in a position to which it has been moved by cam action as the first and second rotators 12 and 13 rotate in opposite directions. Just the protrusion 35 and the indentations 45 and 46 are shown for illustrative purposes.

Thus, the invention provides an apparatus for fish-luring use with a separate fishing line that includes a fishing-line-attachable shaft on which are mounted interacting first and second rotator members. The interaction of a non-planar rearwardly facing end on the first rotator with a non-planar forwardly facing end on the second rotator is produces fish-luring vibrations with a smaller, lighter, less complicated, less expensive, more conveniently fabricated apparatus. Although exemplary embodiments have been shown and described, one of ordinary skill in the art may make many changes, modifications, and substitutions without necessarily departing from the spirit and scope of the invention.

What is claimed is:

1. An apparatus for luring fish using sound, the apparatus comprising:
   a shaft extending axially along a rotational axis, the shaft having a forward end portion for connection to a separate fishing line, a rearward end portion opposite the forward end portion, and a mid-section extending between the forward and rearward end portions;
   a first rotator member having a first hub with a non-planar rearwardly facing end, a cylindrically shaped shield and impeller blades both disposed inside the cylindrically shaped shield and extending from the first hub to the cylindrically shaped shield, said first rotator member being mounted on the mid-section of said shaft slideably for movement axially along said shaft and rotatably for rotation about the rotational axis in response to water pressure against the impeller blades when said shaft is moved forwardly in a body of water, the cylindrically shaped shield of said first rotator member having open front and rear ends joined by a cylindrical wall with an outer surface substantially equidistant from the rotational axis, and the cylindrically shaped shield being devoid of transverse openings through the cylindrical wall and being devoid of anything attached to the cylindrical wall extending farther from the rotational axis than the outer surface of the cylindrical; and
   a second rotator member mounted on the mid-section of the shaft, the second rotator member having a second hub with a non-planar forwardly facing end bearing against the non-planar rearwardly facing end of the first hub as at least said first rotator member rotates relative to said second rotator member,
   one of the non-planar rearwardly facing end of the first hub and the non-planar forwardly facing end of the second hub having circumferentially spaced apart protrusions and the other of the non-planar rearwardly facing end of the first hub and the non-planar forwardly facing end of the second hub having matching circumferentially spaced apart indentations which cause said first rotator member to move axially along the shaft toward and away from said second rotator member as the protrusions move in and out of the indentations during the rotation of said first rotator member relative to said second rotator member, thereby producing fish-luring vibrations.

2. An apparatus as recited in claim 1, wherein:
   the first rotator member is adapted to rotate on the shaft in a first direction in response to said water pressure;
   the second rotator member is mounted on the shaft rotatably for rotation about the rotational axis relative to the first rotator member in response to said water pressure in a second direction that is opposite to the first direction.

3. An apparatus as recited in claim 1, wherein there are more than two protrusions and matching indentations.

4. An apparatus as recited in claim 1, wherein there are at least four protrusions and matching indentations.

5. An apparatus as recited in claim 1, wherein the rearward end portion of said shaft does not include a hook or other components rearward of said second rotator member that substantially disrupts flow of water.

6. An apparatus as recited in claim 5, wherein the rearward end portion of said shaft ends with a swivel-receiving loop.

7. An apparatus as recited in claim 1, wherein the circumferentially spaced apart protrusions and matching circumferentially spaced apart indentations are separated by respective co-planar surfaces perpendicular to an axis of the first and second hubs.

8. An apparatus as recited in claim 7, wherein there are no indentations on the one of the non-planar rearwardly facing end of the first hub and the non-planar forwardly facing end of the second hub that has the circumferential spaced apart protrusions and there are no protrusions beyond the respective co-planar surfaces on the other of the non-planar rearwardly facing end of the first hub and the non-planar forwardly facing end of the second hub that has the matching circumferentially spaced apart indentations.

* * * * *

UNITED STATES PATENT AND TRADEMARK OFFICE
CERTIFICATE OF CORRECTION

PATENT NO. : 7,644,533 B2  Page 1 of 1
APPLICATION NO. : 11/479688
DATED : January 12, 2010
INVENTOR(S) : James M. Hair, III et al.

It is certified that error appears in the above-identified patent and that said Letters Patent is hereby corrected as shown below:

Column 6, Line 26, change "cylindrical;" to --cylindrical wall;--.

Signed and Sealed this

Thirtieth Day of March, 2010

David J. Kappos
*Director of the United States Patent and Trademark Office*